United States Patent
Shen et al.

(10) Patent No.: US 10,248,664 B1
(45) Date of Patent: Apr. 2, 2019

(54) ZERO-SHOT SKETCH-BASED IMAGE RETRIEVAL TECHNIQUES USING NEURAL NETWORKS FOR SKETCH-IMAGE RECOGNITION AND RETRIEVAL

(71) Applicant: Inception Institute of Artificial Intelligence, Abu Dhabi (AE)

(72) Inventors: Yuming Shen, Abu Dhabi (AE); Li Liu, Abu Dhabi (AE); Fumin Shen, Abu Dhabi (AE); Ling Shao, Abu Dhabi (AE)

(73) Assignee: INCEPTION INSTITUTE OF ARTIFICIAL INTELLIGENCE, Abu Dhabi (AE)

( * ) Notice: Subject to any disclaimer, the term of this patent is extended or adjusted under 35 U.S.C. 154(b) by 0 days.

(21) Appl. No.: 16/025,082

(22) Filed: Jul. 2, 2018

(51) Int. Cl.
*G06K 9/00* (2006.01)
*G06K 9/46* (2006.01)
*G06K 9/66* (2006.01)
*G06N 5/04* (2006.01)
*G06F 17/30* (2006.01)

(52) U.S. Cl.
CPC .. *G06F 17/30259* (2013.01); *G06F 17/30277* (2013.01); *G06K 9/00402* (2013.01); *G06K 9/4609* (2013.01); *G06K 9/66* (2013.01); *G06N 5/046* (2013.01)

(58) Field of Classification Search
CPC ......... G06F 17/30277; G06F 17/30259; G06F 17/30256; G06K 9/00402; G06K 9/222; G06K 9/66; G06K 9/4609; G06N 5/046
USPC ................................. 382/113, 156, 158, 305
See application file for complete search history.

(56) References Cited

U.S. PATENT DOCUMENTS

| 8,644,600 | B2 | 2/2014 | Yang et al. |
| 9,147,125 | B2 | 9/2015 | Wang et al. |
| 9,183,228 | B2 | 11/2015 | Wang et al. |
| 9,418,313 | B2 | 8/2016 | Valente |

(Continued)

FOREIGN PATENT DOCUMENTS

| CN | 104200240 | 12/2014 |
| CN | 105069173 | 11/2015 |

(Continued)

OTHER PUBLICATIONS

Liu, Li, et al. "Deep Sketch Hashing: Fast Free-hand Sketch-Based Image Retrieval." arXiv preprint arXiv:1703.05605 (2017). (Year : 2017).*

(Continued)

*Primary Examiner* — Geoffrey E Summers
(74) *Attorney, Agent, or Firm* — Bryan Cave Leighton Paisner, LLP (57) ABSTRACT

This disclosure relates to improved sketch-based image retrieval (SBIR) techniques. The SBIR techniques utilize an architecture comprising three interconnected neural networks to enable zero-shot image recognition and retrieval based on free-hand sketches. Zero-shot learning may be implemented to retrieve one or more images corresponding to the sketches without prior training on all categories of the sketches. The neural network architecture may do so, at least in part, by training encoder hashing functions to mitigate heterogeneity of sketches and images, and by applying semantic knowledge that is learned during a limited training phase to unknown categories.

17 Claims, 4 Drawing Sheets

(56) References Cited

U.S. PATENT DOCUMENTS

| | | | |
|---|---|---|---|
| 2016/0358043 A1* | 12/2016 | Mu | G06K 9/66 |
| 2017/0249535 A1 | 8/2017 | Swaminathan et al. | |
| 2017/0262479 A1* | 9/2017 | Chester | G06F 17/30277 |

FOREIGN PATENT DOCUMENTS

| | | |
|---|---|---|
| CN | 107346327 | 11/2017 |
| WO | 2017020140 | 2/2017 |
| WO | 20170168125 | 10/2017 |

OTHER PUBLICATIONS

Xu, Peng, et al. "SketchMate: Deep Hashing for Million-Scale Human Sketch Retrieval." arXiv preprint arXiv:1804.01401 (2018). (Year: 2018).*

Song, Jifei, et al. "Deep Spatial-Semantic Attention for Fine-Grained Sketch-Based Image Retrieval." Computer Vision (ICCV), 2017 IEEE International Conference on. IEEE, 2017. (Year: 2017).*

Dey, Sounak, et al. "Learning Cross-Modal Deep Embeddings for Multi-Object Image Retrieval using Text and Sketch." arXiv preprint arXiv:1804.10819 (2018). (Year: 2018).*

Sangkloy, Patsorn, et al. "The sketchy database: learning to retrieve badly drawn bunnies." ACM Transactions on Graphics (TOG) 35.4 (2016): 119. (Year: 2016).*

Yang, Yang, et al. "Zero-shot hashing via transferring supervised knowledge." Proceedings of the 2016 ACM on Multimedia Conference. ACM, 2016. (Year: 2016).*

Qi, Yonggang, et al. "Sketch-based image retrieval via siamese convolutional neural network." Image Processing (ICIP), 2016 IEEE International Conference on. IEEE, 2016. (Year: 2016).*

Shen, Yuming, et al. "Zero-Shot Sketch-Image Hashing." arXiv preprint arXiv:1803.02284 (2018). (Year: 2018).*

R. Salakhutdinov and G. Hinton, Semantic hashing. International Journal of Approximate Reasoning, 50(7), 2009.

P. Sangkloy, N. Burnell, C. Ham, and J. Hays. The sketchy database: learning to retrieve badly drawn bunnies. ACM Transactions on Graphics, 35(4):119, 2016.

F. Shen, Y. Xu, L. Liu, Y. Yang, Z. Huang, and H. T. Shen. Unsupervised deep hashing with similarity-adaptive and discrete optimization. IEEE Transactions on Pattern Analysis and Machine Intelligence, pp. (99):1-1, 2018.

Y, Shen, L. Liu, and L. Shao. Unsupervised deep generative hashing. In British Machine Vision Conference (BMVC), 2017.

Y. Shen, L. Liu, L. Shao, and J. Song. Deep binaries: En-coding semantic-rich cues for efficient textual-visual cross retrieval, In ICCV, 2017.

R. Socher, M. Ganjoo, C. D. Manning, and A. Ng. Zero-shot learning through cross-modal transfer. In NIPS, 2013.

J. Song, Y.-Z. Song, T. Xiang, and T. Hospedales. Fine-grained image retrieval: the text/sketch input dilemma. In BMVC, 2017.

J. Song, Y. Yang, Y. Yang, Z. Huang, and H. T. Shen. Inter-media hashing for large-scale retrieval from heterogeneous data sources. In ACM SIGMOD, 2013.

J. Song, Q. Yu, Y.-Z. Song, T. Xiang, and T. M. Hospedales. Deep spatial-semantic attention for fine-grained sketch-based image retrieval. In ICCV, 2017.

B. Thompson. Canonical correlation analysis. Encyclopedia of statistics in behavioral science, 2005.

L. R. Tucker. Some mathematical notes on three-mode factor analysis. Psychometrika, 31(3):279-311, 1966.

F. Wang, L. Kang, and Y. Li. Sketch-based 3d shape retrieval using convolutional neural networks. In CVPR, 2015.

B. Wu, Q. Yang, W.-S. Zheng, Y. Wang, and J. Wang. Quantized correlation hashing for fast cross-modal search. In IJ-CAI, 2015.

Y. Xian, Z. Akata, G. Sharma, Q. Nguyen, M. Hein, and B. Schiele. Latent embeddings for zero-shot classification. In CVPR, 2016.

X, Xu, F. Shen, Y, Yang, D, Zhang, H. Tao Shen. and J. Song, Matrix tri-factorization with manifold regularizations for zero-shot learning. In CVPR, 2017.

E. Yang, C. Deng, W. Liu, X. Liu, D. Tao, and X. Gao. Pair-wise relationship guided deep hashing for cross-modal retrieval. In AAAI, 2017.

Y, Yang, Y. Luo, W. Chen, F, Shen, J. Shao, and H. T. Shen. Zero-shot hashing via transferring supervised knowledge. In ACM MM, 2016.

M. Ye and Y. Guo. Zero-shot classification with discriminative semantic representation learning. In CVPR, 2017.

Q. Yu, F. Liu. Y.-Z. Song. T. Xiang, T. M. Hospedales, and C.-C. Loy, Sketch me that shoe. In CVPR, 2016.

Q. Yu, Y. Yang. Y.-Z. Song. T. Xiang, and T. Hospedales. Sketch-a-net that beats humans. In BMVC, 2015.

Z. Yu, J. Yu, J. Fan, and D. Tao. Multi-modal factorized bi-linear pooling with co-attention learning for visual question answering. In ICCV, 2017.

D. Zhang and W.-J. Li. Large-scale supervised muitimodal hashing with semantic correlation maximization. In AAAI, 2014.

H. Zhang, S. Liu. C. Zhang, W. Ren, R, Wang, and X. Cao, Sketchnet: Sketch classification with web images. In CVPR, 2016.

L. Zhang, T. Xiang, and S. Gong. Learning a deep embedding model for zero-shot learning, In CVPR, 2017.

Z. Zhang and V. Saligrama. Zero-shot learning via semantic similarity embedding. In ICCV, 2015.

Z. Zhang and V. Saligrama. Zero-shot learning via joint latent similarity embedding. In CVPR, 2016.

Y. Zhen and D.-Y. Yeung. Co-regularized hashing for multi-modal data. In NIPS, 2012.

R. Zhou, L. Chen, and L. Zhang. Sketch-based image retrieval on a large scale database. In ACM MM, 2012.

Liu, et al. Deep Sketch Hashing: Fast Free-hand Sketch-Based Image Retrieval, School of Computing Science, University of East Anglia, UK 2017.

Ambhore, et al., Sketch Based Image Retrieval, International Journal of Modern Trends in Engineering, Jul. 2015.

M. Abadi, A. Agarwal, P. Barham, E. Brevdo, Z. Chen, C. Citro, G. S. Corrado, A. Davis, J. Dean, M. Devin, et al. Tensorflow: Large-scale machine learning on heterogeneous distributed systems. arXiv preprint arXiv:1603.04467, 2016.

Z. Akata, S, Reed, D. Walter, H. Lee, and B. Schiele. Evaluation of output embeddings for fine-grained image classification. In CVPR, 2015.

Z. Al-Halah, M. Tapaswi, and R. Stiefelhagen. Recovering the missing link: Predicting class-attribute associations for unsupervised zero-shot learning, In CVPR, 2016.

M. M. Bronstein, A. M. Bronstein, F. Michel, and N. Para-gios. Data fusion through cross-modality metric learning using similarity-sensitive hashing. In CVPR, 2010.

Y. Cao, M. Long, J. Wang, and S. Liu. Collective deep quantization for efficient cross-modal retrieval. In AAAI, 2017.

Y. Cao, M. Long, J. Wang, Q. Yang, and P. S. Yu. Deep visual-semantic hashing for cross-modal retrieval. In ACM SIGKDD, 2016.

S. Changpinyo, W.-L, Chao. B. Gong, and F. Sha. Synthesized classifiers for zero-shot learning. In CVPR, 2016.

S. Changpinyo, W.-L. Chao, and F. Sha. Predicting visual exemplars of unseen classes for zero-shot learning. In ICCV, 2017.

B. Dai, R. Guo, S. Kumar, N, He, and L. Song, Stochastic generative hashing. In ICML, 2017.

M. Defferrard, X. Bresson, and P. Vandergheynst. Convolutional neural networks on graphs with fast localized spectral filtering, In NIPS, 2016.

B. Demirel, R. G. Cinbis, and N. I. Cinbis. Attributes2classname: A discriminative model for attribute-based unsupervised zero-shot learning. In ICCV, 2017.

J. Deng, W. Dong, R. Socher, L.-J. Li, K. Li, and L. Fei-Fei. Imagenet: A large-scale hierarchical image database. In CVPR, 2009.

G. Ding, Y. Guo, and J. Zhou. Collective matrix factorization hashing for multimodal data. In CVPR, 2014.

(56) References Cited

OTHER PUBLICATIONS

Z. Ding, M. Shao, and Y. Fu. Low-rank embedded ensemble semantic dictionary for zero-shot learning. In CVPR, 2017.
M. Eitz, J. Hays, and M. Alexa. How do humans sketch objects? ACM Transactions on Graphics, 31(4):44-1, 2012.
M. Eitz. K. Hildebrand. T. Boubekeur, and M. Alexa. An evaluation of descriptors for large-scale image retrieval from sketched feature lines. Computers & Graphics, 34(5):482-498, 2010.
M. Eitz, K. Hildebrand, T. Boubekeur, and M. Alexa. Sketch-based image retrieval: Benchmark and bag-of-features descriptors. IEEE transactions on visualization and computer graphics, 17(11):1624-1636, 2011.
V. Erin Liong, J. Lu, Y.-P. Tan, and J. Zhou. Cross-modal deep variational hashing, In ICCV, 2017.
A. Frome, G. S. Corrado, J. Shlens, S. Bengio, J. Dean, T. Mikolov, et al. Devise: A deep visual-semantic embed¬ding model. In NIPS, 2013.
Y. Gong, S. Lazebnik, A. Gordo, and F. Perronnin. Itera¬tive quantization: A procrustean approach to learning binary codes for large-scale image retrieval, IEEE Transactions on Pattern Analysis and Machine Intelligence, 35(12):2916-2929, 2013.
D. K. Hammond, P. Vandergheynst, and R. Gribonval. Wavelets on graphs via spectral graph theory. Applied and Computational Harmonic Analysis, 30(2):129-150, 2011.
G. Hu, Y. Hua, Y. Yuan. Z. Zhang, Z. Lu, S, S. Mukherjee, T. M. Hospedales, N. M. Robertson, and Y. Yang. Attribute-enhanced face recognition with neural tensor fusion net¬works. In ICCV, 2017.
R. Hu and J. Collomosse. A performance evaluation of gra-dient field hog descriptor for sketch based image retrieval. In CVIU, 2013.
R. Hu, T. Wang, and J. Collomosse. A bag-of-regions ap-proach to sketch-based image retrieval. In ICIP, 2011.
H. Jiang, R. Wang, S. Shan, Y. Yang, and X. Chen. Learning discriminative latent attributes for zero-shot classification. In ICCV, 2017.
Q.-Y. Jiang and W.-J. Li, Deep cross-modal hashing. In CVPR, 2017.
N. Karessli, Z. Akata, B. Schiele, and A. Bulling. Gaze em-beddings for zero-shot image classification. In CVPR, 2017.
D. Kingma and J. Ba. Adam: A method for stochastic opti-mization. In ICLR, 2015.
D. Kingma and M. Welling, Auto-encoding variational bayes. In ICLR, 2014.
T. N. Kipf and M. Welling. Semi-supervised classification with graph convolutional networks. In ICLR, 2017.
E. Kodirov, T. Xiang, and S. Gong. Semantic autoencoder for zero-shot learning, In CVPR, 2017.
A. Krizhevsky, I. Sutskever, and G. E. Hinton. Imagenet classification with deep convolutional neural networks. In NIPS, 2012.
S. Kumar and R. Udupa. Learning hash functions for cross-view similarity search. In IJCAI, 2011.
C. H. Lampert, H. Nickisch, and S. Harmeling. Attribute-based classification for zero-shot visual object categoriza-tion. IEEE Transactions on Pattern Analysis and Machine Intelligence, 36(3):453-465, 2014.
Y. Li, D. Wang, H. Hu, Y. Lin, and Y. Zhuang. Zero-shot recognition using dual visual-semantic mapping paths. In CVPR, 2017.
Z. Lin, G. Ding, M. Hu, and J. Wang, Semantics-preserving hashing for cross-view retrieval. In CVPR, 2015.
V. E. Liong, J. Lu, G. Wang, P. Moulin, and J. Zhou. Deep hashing for compact binary codes learning. In CVPR, 2015.
L. Liu, F. Shen, Y. Shen, X. Liu, and L. Shao. Deep sketch hashing: Fast free-hand sketch-based image retrieval. In CVPR, 2017.
L. Liu, M. Yu, and L. Shao. Latent structure preserving hash-ing. International Journal of Computer Vision, 122(3):439-457, 2017.
Y. Long, L. Liu, Y. Shen, L. Shao, and J. Song, Towards affordable semantic searching: Zero-shot. retrieval via dominant attributes. In AAAI, 2018.
L. v. d. Maaten and G. Hinton. Visualizing data using t-sne. Journal of Machine Learning Research, 9(Nov):2579-2605, 2008.
D. Mandal, K. N. Chaudhury, and S. Biswas. Generalized se-mantic preserving hashing for n-label cross-modal retrieval. In CVPR, 2017.
J. Masci, M. M. Bronstein, A. M. Bronstein, and J. Schmid-huber. Multimodal similarity-preserving hashing. IEEE transactions on pattern analysis and machine intelligence, 36(4):824-830, 2014.
T. Mikolov, K. Chen, G. Corrado, and J. Dean. Efficient estimation of word representations in vector space. In ICLR Workshop, 2013.
V. Nair and G. E. Hinton. Rectified linear units improve re-stricted boltzmann machines. In ICML, 2010.
M. Norouzi, T. Mikoiov, S. Bengio, Y. Singer, J. Shlens, A. Frome, G. S. Corrado, and J. Dean. Zero-shot learning by convex combi-nation of semantic embeddings. In ICLR, 2014.
K. Pang, Y.-Z. Song, T. Xiang, and T. Hospedales. Cross-domain generative learning for fine-grained sketch-based image retrieval. In BMVC, 2017.
S. Parui and A. Mittal. Similarity-invariant sketch-based im-age retrieval in large databases. In ECCV, 2014.
Y. Qi, Y.-Z. Song, H. Zhang, and J. Liu. Sketch-based image retrieval via siamese convolutional neural network. In ICIP, 2016.
J. M. Saavedra. Sketch based image retrieval using a soft compu-tation of the histogram of edge local rientations (s-helo). In ICIP, 2014.

* cited by examiner

ZERO-SHOT SKETCH-BASED IMAGE RETRIEVAL TECHNIQUES USING NEURAL NETWORKS FOR SKETCH-IMAGE RECOGNITION AND RETRIEVAL

TECHNICAL FIELD

This disclosure is related to sketch-based image retrieval (SBIR) techniques and, more particularly, to SBIR techniques that utilize neural networks and artificial intelligence (AI) algorithms to implement zero-shot SBIR on unknown categories of sketches and images.

BACKGROUND

Generally speaking, sketch-based image retrieval (SBIR) is a technology that aims at matching sketches (e.g., free-hand or hand-drawn sketches) with corresponding images (e.g., photographs or other media captured with an imaging sensor). Current techniques for performing SBIR are inadequate for a number of reasons. Like other types of cross-modal retrieval techniques, SBIR may be implemented, at least to some extent, if the content of the sketches are limited to specific categories of information, and the image retrieval mechanism is pre-trained on those specific categories prior to testing or operating the SBIR system. SBIR retrieval is a much simpler task in this scenario because the visual knowledge of all categories has been explored during the pre-training phase. However, in real-world scenarios, there is no guarantee that the training categories cover all concepts of potential SBIR requests and, in many cases, the SBIR requests can be directed to content that falls outside the categories learned during training. Current SBIR retrieval techniques fail to effectively identify images in these scenarios.

BRIEF DESCRIPTION OF DRAWINGS

To facilitate further description of the embodiments, the following drawings are provided, in which like references are intended to refer to like or corresponding parts, and in which.

DETAILED DESCRIPTION OF EXEMPLARY EMBODIMENTS

The present disclosure relates to systems, methods, and apparatuses that are configured to implement improved sketch-based image retrieval (SBIR) techniques. In certain embodiments, the SBIR techniques utilize an architecture comprising three interconnected neural networks to enable zero-shot image recognition and retrieval based on free-hand sketches. The zero-shot SBIR techniques are able to retrieve one or more images corresponding to the sketches without prior training on all categories of the sketches. In certain embodiments, this is accomplished, at least in part, by utilizing the neural network architecture to train encoder hashing functions to mitigate the heterogeneity of sketches and images by generating unified binary codes for the sketches and images that can be matched to one another. Semantic knowledge learned during a limited training phase can be leveraged to identify content of unknown or unseen categories by generalizing the knowledge such that it can be applied to the unknown or unseen categories. Hence, by applying these techniques, sketches associated with unknown categories can be used to query a database of corresponding images, or vice versa.

The technologies discussed herein can be used in a variety of different contexts and environments. One useful application is in the context of law enforcement. For example, many law enforcement agencies maintain a database of images (e.g., that includes mugshots corresponding to criminals or other individuals), and integrating the present technologies into such systems can enable images of the individuals to be retrieved based on the sketches. Another useful application of these technologies is in the context of e-commerce systems (e.g., that can enable customers to query a product database using sketches of the products). A further useful application of these technologies is in the context of surveillance systems (e.g., to permit identification of individuals captured by surveillance videos and/or images to be identified based on sketches). The technologies discussed herein can be applied to other types of systems as well.

In certain embodiments, an SBIR system utilizes three neural networks to implement the zero-shot retrieval techniques described herein. Two of the neural networks—a sketch encoding network and an image encoding network—are used for encoding sketches and images, respectively. The sketch encoding network and image encoding network may be implemented as convolutional neural networks (CNNs). The encoding networks may include attention models that are used to identify regions of sketches and images useful for cross-modal mapping, and to ignore regions that are not useful. The encoders utilize this information to generate binary representations of the sketches and images that can be used as a basis for cross-modal comparison.

In certain embodiments, the sketch encoding network and image encoding network are trained by a third neural network—referred to herein as a multi-modal training network—prior to testing or operating the SBIR system. During a training phase, the multi-modal training network may be configured to perform, inter alia, the following training functions: (1) train the hashing functions of the sketch and image encoding networks in a manner that diminishes or lessens the heterogeneity between image data and sketch data; and (2) train the hashing functions of the sketch and image encoding networks to leverage semantic information that was learned from "seen categories" during a training phase to perform SBIR on "unseen categories." In the context of this disclosure, the phrases "seen categories," "learned categories," "known categories" or the like generally refers to categories that are used for training the SBIR system, while the phrases "unseen categories," "unknown categories" or the like generally refer to categories that are not used for training the SBIR system.

The embodiments described herein provide a variety of advantages over conventional SBIR techniques. One significant advantage is the ability to identify and retrieve images based on sketch queries without being trained on the specific categories of the sketch queries. For example, even though the SBIR system has not be pre-trained to recognize categories of sketches related to animals, vehicles and/or individuals, the SBIR system is able to retrieve images corresponding to sketches that fall within these categories.

Another significant advantage is that the SBIR techniques described herein can be implemented on large-scale datasets (e.g., which include tens of thousands, hundreds of thousands or even millions of images and sketches) because the techniques have low computational costs. The low computational costs can be attributed, at least in part, to the specialized hashing functions that can quickly and efficient encode and retrieve sketches and images. Moreover, when applied in the context of networked-based systems that may include multiple users submitting queries, the low computational costs of executing the queries allows for increased network bandwidth and reduced resource consumption across the network.

As evidenced by the disclosure herein, the SBIR techniques set forth in the disclosure are rooted in computer technologies that overcome existing problems in known cross-modal retrieval systems, specifically problems dealing with SBIR in the context of unknown categories. These techniques describe a technical solution (e.g., one that utilizes various AI-based neural networking and machine learning techniques) for overcoming such limitations. For example, the SBIR system described herein takes advantage of novel AI and machine learning techniques to train sketch and image encoders to generate unified binary codes that can be used as a basis for comparison and to apply semantic knowledge of learned categories to unknown categories. This technology-based solution marks an improvement over existing computing capabilities and functionalities related to cross-modal retrieval systems by allowing retrieval of images corresponding to unknown categories in zero-shot setting, and doing so in a manner that improves the accuracy and speed of the retrieval mechanism.

In accordance with certain embodiments, a system is provided for performing sketch-based image retrieval comprising: one of more computing devices comprising one or more processors and one or more non-transitory storage devices for storing instructions, wherein execution of the instructions by the one or more processors causes the computing device to: encode images using an image encoding network that has been trained to mitigate heterogeneity associated with sketches and the images; receive a query comprising a sketch from an unknown category; encode the sketch using an sketch encoding network that has been trained to mitigate heterogeneity associated with the sketches and the images; and utilize the encoded sketch to execute a zero-shot retrieval function for retrieving one or more of the images corresponding to the unknown category associated with the sketch.

In accordance with certain embodiments, a method is provided for performing sketch-based image retrieval comprising: encoding images using an image encoding network that has been trained to mitigate heterogeneity associated with sketches and the images; receiving a query comprising a sketch from an unknown category; encoding the sketch using an sketch encoding network that has been trained to mitigate heterogeneity associated with the sketches and the images; and utilizing the encoded sketch to execute a zero-shot retrieval function for retrieving one or more of the images corresponding to the unknown category associated with the sketch.

In accordance with certain embodiments, a computer program product is provided for performing sketch-based image retrieval, the computer program product comprising a computer-readable medium including codes for causing a computer to: encode images using an image encoding network that has been trained to mitigate heterogeneity associated with sketches and the images; receive a query comprising a sketch from an unknown category; encode the sketch using an sketch encoding network that has been trained to mitigate heterogeneity associated with the sketches and the images; and utilize the encoded sketch to execute a zero-shot retrieval function for retrieving one or more of the images corresponding to the unknown category associated with the sketch.

The embodiments described in this disclosure can be combined in various ways. Any aspect or feature that is described for one embodiment can be incorporated to any other embodiment mentioned in this disclosure. Moreover, any of the embodiments described herein may be hardware-based, may be software-based, or, preferably, may comprise a mixture of both hardware and software elements. Thus, while the description herein may describe certain embodiments, features or components as being implemented in software or hardware, it should be recognized that any embodiment, feature or component that is described in the present application may be implemented in hardware and/or software.

Embodiments may include a computer program product accessible from a computer-usable or computer-readable medium providing program code for use by or in connection with a computer or any instruction execution system. A computer-usable or computer-readable medium may include any apparatus that stores, communicates, propagates, or transports the program for use by or in connection with the instruction execution system, apparatus, or device. The medium can be a magnetic, optical, electronic, electromagnetic, infrared, or semiconductor system (or apparatus or device) or a propagation medium. The medium may include a computer-readable storage medium such as a semiconductor or solid state memory, magnetic tape, a removable computer diskette, a random access memory (RAM), a read-only memory (ROM), a rigid magnetic disk and an optical disk, etc.

A data processing system suitable for storing and/or executing program code may include at least one processor coupled directly or indirectly to memory elements through a system bus. The memory elements can include local memory employed during actual execution of the program code, bulk storage, and cache memories which provide temporary storage of at least some program code to reduce the number of times code is retrieved from bulk storage during execution. Input/output or I/O devices (including but not limited to keyboards, displays, pointing devices, etc.) may be coupled to the system either directly or through intervening I/O controllers.

Network adapters may also be coupled to the system to enable the data processing system to become coupled to other data processing systems or remote printers or storage devices through intervening private or public networks. Modems, cable modems and Ethernet cards are just a few of the currently available types of network adapters.

Figure 1:
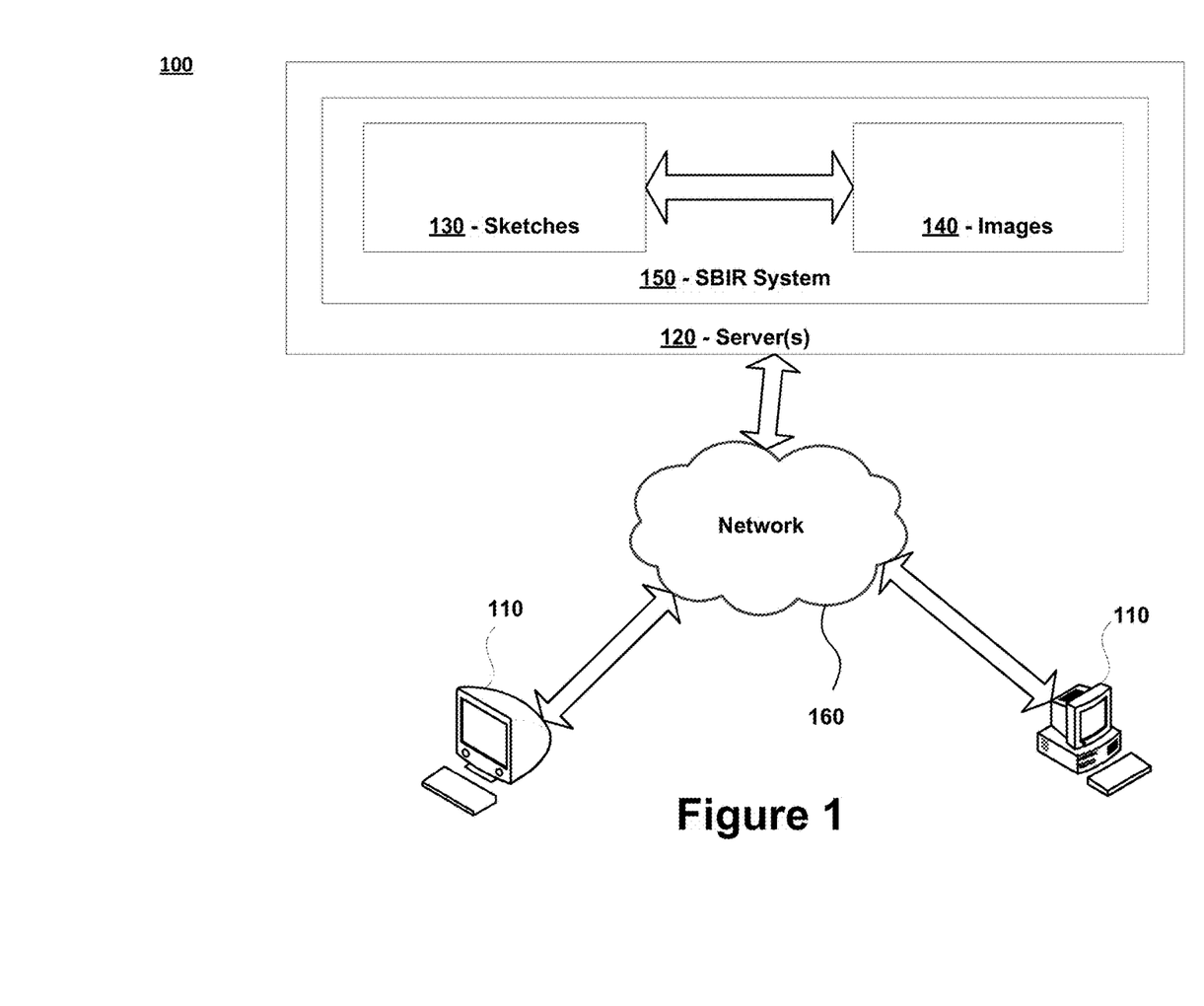
FIG. 1 is a block diagram of a system in accordance with certain embodiments of the present invention.

FIG. 1 is an exemplary system 100 for executing the SBIR techniques described herein. In this exemplary system 100, an SBIR system 150 is stored on one or more servers 120. The SBIR system 150 may be utilized in a variety of different contexts. For example, the SBIR system 150 may be integrated into a law enforcement image retrieval system (e.g., that enables retrieval of images 140, such as mugshots, based on sketches 130 of suspects or other individuals), an e-commerce system (e.g., to enable identification and retrieval of images 140 corresponding to products based on sketches 130), a surveillance system (e.g., to search surveillance videos or images 140 based on sketches 130 of individuals), and/or other systems that may benefit from SBIR.

The SBIR system 150 can configured to perform any and all functions described herein with respect to analyzing, encoding, matching and/or retrieving sketches 130 and images 140. Generally speaking, the SBIR system 150 can be configured to receive queries in the form of sketches 130 and to retrieve images 140 corresponding to the sketches 130. For example, in response to receiving a sketch 130 of a table, the SBIR system 150 may identify and retrieve one or more images 140 that correspond to a table. As another example, in response to receiving a sketch 130 of an individual, the SBIR system 150 may identify and retrieve one or more images 140 of the specific individual identified in the sketch 130. As a further example, in response to receiving a sketch 130 of a vehicle, the SBIR system 150 may identify and retrieve one or more images 140 of vehicles. In certain embodiments, the SBIR system 150 can additionally, or alternatively, be configured to receive queries in the form of images 140 and to retrieve sketches 130 corresponding to the images 140. For example, in response to receiving an image 140 of a computer, the SBIR system 150 may identify and retrieve one or more sketches 130 that correspond to a computer.

The sketches 130 may represent drawings, paintings, graphical depictions or the like. The sketches 130 may include free-hand and/or hand-drawn content that is created manually by an individual (e.g., using a pencil or pen) and/or digitally created using a computer (e.g., using software that enables the manual creation of sketches and/or automated creation of sketches). In certain embodiments, the sketches 130 received by the SBIR system 150 are provided in a digital format. Sketches 130 that are not originally created in a digital format (e.g., created on paper) can be converted to a digital format using appropriate conversion devices (e.g., image scanners and optical scanners). The images 140 stored and/or retrieved by the SBIR system 150 may represent digital representations of photographs, pictures or the like. The images 140 may initially be captured by recording light or other electromagnetic radiation electronically (e.g., using one or more image sensors) or chemically (e.g., using light-sensitive materials or films). Once again, any images 140 that are not originally created in a digital format can be converted to a digital format using appropriate conversion devices (e.g., image scanners and optical scanners).

As mentioned above, the SBIR system 150 is configured to perform image recognition and retrieval based on received sketches 130. Generally speaking, the SBIR system 150 can perform the functions related to matching the sketches 130 to images 140, in part, by utilizing specialized, trained encoders that are configured to encode the sketches 130 and images 140 into binary representations (e.g., binary codes) that allow for a reduction or mitigation of the heterogeneity between the sketches 130 and the images 140. The SBIR system 150 is also configured to utilize semantic knowledge that was learned during a training phase on a limited number of known categories of sketches 130 and images 140 to enable image retrieval of sketches 130 that fall into unknown categories. In other words, the SBIR system 150 is able to generalize the semantic knowledge learned from known categories of information to identify images corresponding to sketches 130 that are in unknown or unseen categories. As explained in further detail below, the aforementioned sketch-image matching functions are implemented using three specialized neural networks that work in concert with one another to achieve these objectives.

The queries and/or requests received and fulfilled by the SBIR system 150 can be submitted directly to the SBIR system 150 (e.g., via one or more input devices attached to the one or more servers 120 hosting the SBIR system 150). The requests can additionally, or alternatively, be submitted by one or more computing devices 110. For example, as shown in FIG. 1, a plurality of computing devices 110 may be connected to the SBIR system 150 to enable remote users to access the SBIR system 150 over a network 160. The servers 120 and computing devices 110 may present information and interfaces that enable individuals to submit the requests and to view the results generated by the SBIR system 150 (e.g., to view images 140 that match the sketches 130 submitted as queries and other information related to the searches conducted by the SBIR system 150). The interfaces provided to the servers 120 and computing devices 110 may also enable individuals to perform functions related to controlling and managing the searches performed by the SBIR system 150 (e.g., by applying filters to the searches and/or controlling the display of the search results).

In certain embodiments, the computing devices 110 may represent desktop computers, laptop computers, mobile devices (e.g., smart phones, personal digital assistants, tablet devices, vehicular computing devices or any other device that is mobile in nature) or other types of computing devices. In certain embodiments, the SBIR system 150 is stored on one or more servers 120. The one or more servers 120 may generally represent any type of computing device, including any of the computing devices 110 mentioned above. In certain embodiments, the one or more servers 120 comprise one or more mainframe computing devices that execute web servers capable of communicating with the computing devices 110 and/or other devices over the network 160. The network 160 may represent any type of communication network, e.g., such as one that comprises a local area network (e.g., a Wi-Fi network), a personal area network (e.g., a Bluetooth network), a wide area network, an intranet, the Internet, a cellular network and/or other types of networks.

All the components illustrated in FIG. 1, including the computing devices 110 and servers 120, can be configured to communicate directly with each other and/or over the network 160 via wired or wireless communication links, or a combination of the two. The computing devices 110 and servers 120 can also be equipped with one or more transceiver devices, one or more computer storage devices (e.g., RAM, ROM, PROM, SRAM, etc.) and one or more processing devices (e.g., a central processing unit) that are capable of executing computer program instructions. The computer storage devices are preferably physical, non-transitory mediums.

Figure 2:
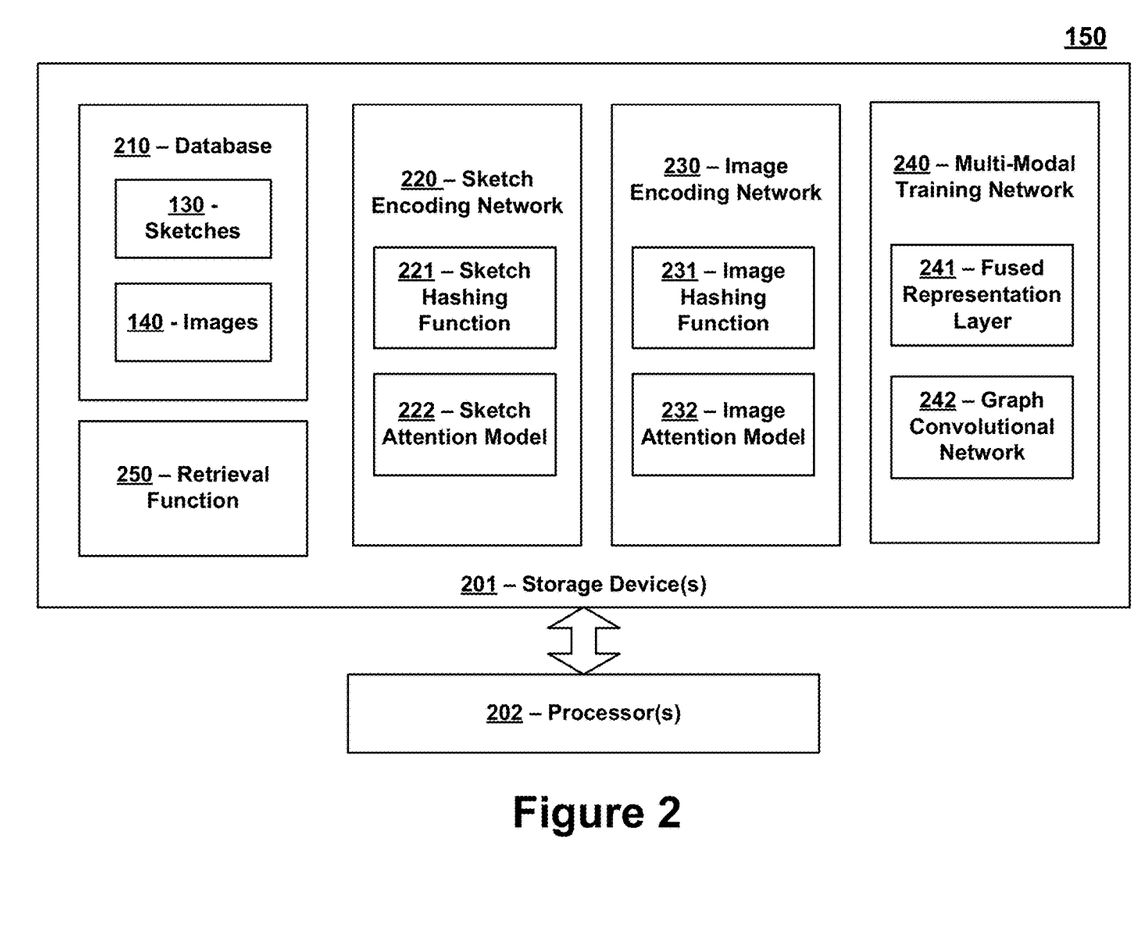
FIG. 2 is a block diagram of a SBIR system in accordance with certain embodiments of the present invention.

FIG. 2 is a block diagram of an exemplary SBIR system 150 in accordance with certain embodiments of the present invention. The SBIR system 150 includes one or more storage devices 201 that are in communication with one or more processors 202. The one or more storage devices 201 can include: i) non-volatile memory, such as, for example, read only memory (ROM) or programmable read only memory (PROM); and/or (ii) volatile memory, such as, for example, random access memory (RAM), dynamic RAM (DRAM), static RAM (SRAM), etc. In these or other embodiments, storage devices 201 can comprise (i) non-transitory memory and/or (ii) transitory memory. The one or more processors 202 can include one or more central processing units (CPUs), controllers, microprocessors, digital signal processors, and/or computational circuits. The one or more storage devices 201 store data and instructions associated with a database 210, a sketch encoding network 220, an image encoding network 230, a multi-modal training network 240 and a retrieval function 250. The one or more processors 202 are configured to execute instructions associated with these components which are stored on the one or more storage devices 201. Each of these components is described in further detail below.

The database 210 stores a plurality of sketches 130 and a plurality of images 130. As mentioned above, the sketches 130 may represent free-hand or computed-based drawings or graphical depictions and may be received by the SBIR system 150 as queries for retrieving images 140. The images 140 may be photographs, pictures or like which are stored in databases that are maintained by law enforcement agencies, online retailers, surveillance systems, and/or other entities. In response to receiving sketch queries, a retrieval function 250 identifies and retrieves one or more of the images 140. In certain embodiments, the retrieval function 250 may additionally, or alternatively, identify and retrieve one or more corresponding sketches 130 in response to receiving image queries.

The sketch encoding network 220 may represent a deep neural network (e.g., such as a CNN) that encodes sketches 130. More specifically, the sketch encoding network 220 may include a sketch hashing function 221 that is configured to encode the sketches 130 in a specialized manner that allows for matching the sketches 130 to the images 140, or vice versa. When encoding the sketches 130, the sketch encoding network 220 may initially render a sketch 130 to a set of convolutional layers in order to generate feature maps. A sketch attention model 222 uses this information to identify regions in the sketch 130 that are informative for cross-modal mapping and to ignore regions that are not informative for cross-modal mapping. In certain embodiments, the sketch attention model 222 may be configured to generate a 256-D feature that identifies the key components of the sketch 130. The information output by the sketch attention model 222 may then be used by the sketch hashing function 221 to produce a binary representation or encoding of the sketch 130. The binary representation or encoding of the sketch 130 may be used for cross-modal matching with the images 130. For example, the binary representation or encoding of the sketch 130 may be utilized by the retrieval function 250 to identify and retrieve one or more corresponding images 140 that are associated with the same category as the sketch 130. Also, the binary representation or encoding of the sketch 130 may be stored for comparison against image queries that are submitted.

The image encoding network 230 is configured to encode the images 140 in a manner that is similar to how the sketches 130 are encoded by the sketch encoding network 230. Like the sketch encoding network 230, the image encoding network 230 may represent a CNN or other deep neural. The image encoding network 230 may include a image hashing function 231 that is configured to encode the images 140 in a specialized manner that allows for matching the sketches 130 to the images 140, or vice versa. When encoding the images 140, the image encoding network 230 may initially render an image 140 to a set of convolutional layers in order to generate feature maps. An image attention model 232 uses this information to identify regions in the image 140 that are informative for cross-modal mapping and to ignore regions that are not informative for cross-modal mapping. In certain embodiments, the image attention model 232 may be configured to procedure a 256-D feature that identifies the key components of the images 140. The information output by the image attention model 232 may then be used by the image hashing function 231 to produce a binary representation or encoding of the image 140. The binary representation or encoding of the image 140 may be used for cross-modal matching with the sketches 130. For example, the binary representation or encoding of the image 140 may be utilized by the retrieval function 250 to identify and retrieve one or more corresponding sketches 130 that are associated with the same category as the image 140. Also, the binary representation or encoding of the image 140 may be stored for comparison against sketch queries that are submitted.

The multi-modal training network 240, which may also be implemented as a CNN or other neural network, is used to train the sketching encoding network 220 and image encoding network 230 prior to operational or testing phases. More specifically, the multi-modal training network 240 can be used to train the sketch hashing function 221 and image hashing function 231 of the sketch and image encoding networks in a manner that diminishes or lessens the heterogeneity between image data and sketch data. This may be accomplished, at least in part, by training the sketch hashing function 221 and image hashing function 231 to generate binary codes in a uniform fashion such that the binary codes generated for sketches 130 can be matched to the binary codes generated for images 140, or vice versa. For example, the multi-modal training network 240 can utilize a fused representation layer 241 (e.g., a Kronecker product fusion layer) to assist with training the encoders. The fused representation layer 241 can be configured to merge the feature vector outputs of the sketch attention model 222 and image attention model 232 of the sketch into a single feature vector for each sketch-image pair that is presented during training. By indexing the sketches 130 and images 140 in accordance with categorical information, the sketching encoding network 220 and image encoding network 230 are able to learn compact binary codes for known categories of sketches 130 and images 140.

As mentioned above, another function performed by the multi-modal training network 240 is to transfer the semantic knowledge learned from known categories during training to unknown categories that may arise during testing or operations. In certain embodiments, this function is accomplished in part using a graph convolutional network (GCN) 242. For example, during the aforementioned process for training the sketch encoding network 220 and image encoding network 230 to jointly produce codes, the hidden neural representations associated with the fused representation layer 241 may be enhanced with semantic information (e.g., word vectors, labels and/or other semantic information) to store data that specifies relationships between sketches 130 and images 140. A decoding model can then be configured to reconstruct the semantic information, thus allowing the SBIR system 150 (including the sketching encoding network 220 and image encoding network 230) to learn semantic-aware hash codes. Exemplary embodiments of the GCN 242 and decoding model are described in further detail below.

Exemplary embodiments of the SBIR system 150 and the aforementioned sub-components (e.g., the database 210, the sketch encoding network 220, the image encoding network 230, the multi-modal training network 240 and the retrieval function 250) are described in further detail below. While the sub-components of the SBIR system 150 may be depicted in FIG. 2 as being distinct or separate from one other, it should be recognized that this distinction may be a logical distinction rather than a physical distinction. Any or all of the sub-components can be combined with one another to perform the functions described herein, and any aspect or feature that is described as being performed by one sub-component can be performed by any or all of the other sub-components. Also, while the sub-components of the SBIR system 150 may be illustrated as being implemented in software in certain portions of this disclosure, it should be recognized that the sub-components described herein may be implemented in hardware and/or software.

Figure 3:
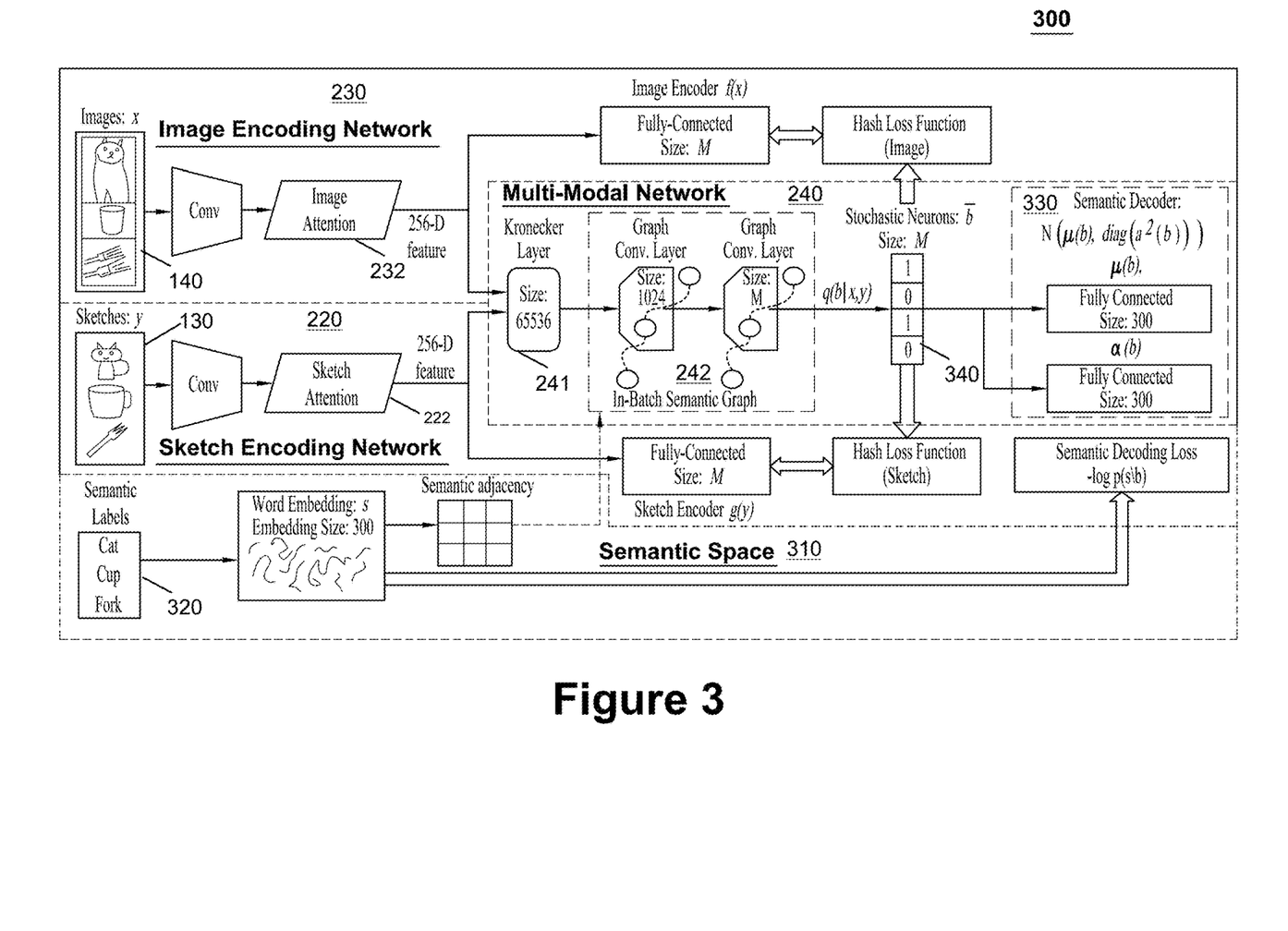
FIG. 3 is a diagram illustrating an exemplary architecture for a SBIR system in accordance with certain embodiments.

FIG. 3 is a diagram illustrating an exemplary architecture 300 for a SBIR system 150 in accordance with certain embodiments. The exemplary architecture 300 illustrates underlying architectures for the sketch encoding network 220, the image encoding network 230 and the multi-modal training network 240. The exemplary architecture 300 also includes a semantic space 310 that illustrates how semantic information 320 related to known categories or classes can be utilized to perform SBIR for unknown categories or classes. Before getting into the specifics of each of these sub-components, a formulation of the problem that the SBIR system 150 may be configured to solve is provided.

One problem the SBIR 150 system may be configured to solve is to perform SBIR using deep binary codes 340 under a zero-shot setting, where the image and sketch data belonging to the known or seen categories are only used for training. The SBIR 150 system may be configured to encode and match sketches 130 of unseen categories with images 140, where the sketches and images belong to categories that were never addressed during training.

In addressing this problem, consider a multi-modal data collection $\mathcal{O}^c = \{X^c, Y^c\}$ from seen categories $C^c$ covering both real images $X^c = \{x_i^c\}_{i=1}^N$ and sketch images $Y^c\{y_i^c\}_{i=1}^N$ for training, where N indicates the set size. For the simplicity of presentation, it is assumed that image and sketch data with the same index $_i$, i.e., $x_i^c$ and $y_i^c$, share the same category label. Additionally, with respect to zero-shot learning algorithms, a set of semantic representations $S^c = \{s_i^c\}_{i=1}^N$ may be used in transferring supervised knowledge for known categories to the unseen categories. The aim is to learn two deep hashing functions $f(\bullet)$ and $g(\bullet)$ for encoding images and sketches, respectively. Given a set of image-sketch data $\mathcal{O}^u = \{X^u, Y^u\}$ belonging to the unseen categories $C^u$ used for testing, the proposed deep hashing functions encode these unseen data into binary codes, i.e., f: $\mathbb{R}^d \to \{0,1\}^M$, g: $\mathbb{R}^d \to (0,1)^M$, where $^d$ refers to the original data dimensionality and $^M$ is the targeted hash code length. As the proposed model handles SBIR under the zero-shot setting, there should be no intersection between the seen categories for training and the unseen categories used for testing, i.e., $C^c \cap C^u = \emptyset$.

Having formulated the problem, consider the architecture 300 of the SBIR system 150 shown in FIG. 3. The image encoding network 230 and sketch encoding network 220 may refer to the binary encoders $f(\bullet)$ and $g(\bullet)$ for images 140 and sketches 130, respectively. An image 140 or sketch 130 is rendered to a set of corresponding convolutional layers ("Conv") to produce a feature map. The feature maps may be obtained, at least in part, using a CNN (e.g., such as AlexNet). The image attention model 232 and sketch attention model 222 mix informative parts of the images 140 and sketches 130 into a single feature vector for further processing. The image attention model 232 and sketch attention model 222 may each utilize weighted pooling techniques to produce a 256-D feature. The 256-D feature may identify the key portions of the images 140 and sketches 130 (e.g., the portions of the images 140 and sketches 130 that are informative for cross-modal mapping). Binary encoding may be performed by a fully-connected layer taking inputs from the attention models with a sigmoid nonlinearity.

During training, $f(\bullet)$ and $g(\bullet)$ are regularized by the output of the multi-modal network 240, such that these two encoders are configured to learn modal-free representations for zero-shot sketch-image matching.

In certain embodiments, the multi-modal network 240 only functions in a training phase during which it learns the joint representations for sketch-image hashing, thus addressing the problem of modal heterogeneity. One possible solution for this is to utilize a fused representation layer 241 taking inputs from both image and sketch modalities for further encoding. For example, the fused representation layer 241 can be implemented using a Kronecker product fusion layer. The Kronecker product fusion layer can be configured to utilize inputs from the image and sketch attention models, and to produce a single feature vector for each pair of data points. The training images and sketches can then be indexed in a coherent category order. Therefore, the proposed network is able to learn compact codes for both images 140 and sketches 130 with clear categorical information.

In addition to solving the heterogeneity problem, the SBIR system 150 can also be configured to address the problem of implementing zero-shot hashing on unseen or unknown categories. In order to accomplish this, the SBIR system 150 may utilize the semantic information 320 (e.g., semantic labels) from the semantic space 310. More specifically, the semantic information 320 of the training data can be leveraged to generalize knowledge from the seen categories to the unseen categories. The semantic representations (e.g., which may include word vectors) can be used to implicitly determine the category-level relations between data points from different classes. In view of this, during the joint code learning process, the hidden neural representations can be enhanced by the semantic relations within a batch of training data using the graph convolutional networks (GCNs) 242. For example, as shown in FIG. 3, two graph convolutional layers are incorporated into the multi-modal training network 240, successively following the Kronecker layer. In this manner, the in-batch data points with strong latent semantic relations are permitted to interact during gradient computation. It is noted that the output length of the second graph convolutional layer for each data point is exactly the target hash code length, i.e., $^M$.

To obtain binary codes 340 as the supervision of $f(\bullet)$ and $g(\bullet)$, a stochastic generative model may be utilized for hashing. A back-propagatable structure of stochastic neurons can be built on the top of the second graph convolutional layer to produce hash codes. As shown in FIG. 3, a decoding model 330 is topped on the stochastic neurons for reconstructing the semantic information. By maximizing the decoding likelihood with gradient-based methods, the whole network is able to learn semantic-aware hash codes, which enables zero-shot sketch-image hashing to be executed.

As mentioned above, the fused representation layer 241 provides assistance with sketch-image fusion, which addresses the problem associated with mitigating the heterogeneity of images 140 and sketches 130. With regard to implementing the fused representation layer 241, an information-rich fused neural representation is in demand for accurate encoding and decoding. Kronecker-product-based feature learning may be preferable for use as the fusion network. Denoting the attention model outputs of a sketch-image pair $\{y,x\}$ from the same category as $h^{(sk)} \in \mathbb{R}^{256}$ and $h^{(im)} \in \mathbb{R}^{256}$ a non-linear data fusion operation can be derived as $$W \times_1 h^{(sk)} \times_3 h^{(im)}$$

Where:
W is a third-order tensor of fusion parameters;
× denotes a tensor dot product;
$_1h^{(sk)}$ represents the hidden representation of a sketch in the neural network; and
$_3h^{(im)}$ represents the hidden representation of an image in the neural network.

As indicated above, W is a third-order tensor of fusion parameters and x denotes tensor dot product. The left subscript is used to indicate the axis on which the tensor dot operates. Decompositing W with a decomposition function, the fused output of the Kronecker layer $h^{(kron)}$ in our model is derived as:

$$h^{(kron)} = \delta((h^{(sk)}W^{(sk)}) \otimes (h^{(im)}W^{(im)}))$$

Where:
$W^{(sk)}$, $W^{(im)}$ are trainable linear transformation parameters;
$\otimes$ is the Kronecker product operation between two tensors;
$h^{(sk)}$ represents the hidden representation of a sketch in the neural network; and
$h^{(im)}$ represents the hidden representation of an image in the neural network.

The above function results in a 65536-D feature vector. Here $\otimes$ is the Kronecker product operation between two tensors, and, $W^{(sk)}$, $W^{(im)} \in \mathbb{R}^{256 \times 256}$ are trainable linear transformation parameters. $\delta(\cdot)$ refers to the activation function, which is the ReLU nonlinearity for this layer.

In certain embodiments, a Kronecker layer may be a better choice in feature fusion for zero-shot sketch-image hashing than many other methods (e.g., such as layer concatenation or factorized model) because the Kronecker layer largely expands the feature dimensionality of the hidden states with a limited number of parameters, and thus consequently stores more expressive structural relation between sketches and images.

Moving on, the discussion below addresses how the categorical semantic relations can be enhanced using the graph convolutional networks 242. Considering a batch of training data $\{x_i, y_i, s_i\}_{i=1}^{N_B}$ comprising $N_B$ category-coherent sketch-image pairs with their semantic representations $\{s_i\}$, the hidden state of the l-th layer is denoted in the multi-modal training network 240 of this training batch as $H^l$ to be rendered to a graph convolutional layer. With respect to the graph convolutional layers, each training batch is regarded as an $N_B$-vertex graph. Therefore, a convolutional filter $g_\theta$ parameterized by $\theta$ can be applied to $H^l$, producing the (l+1)-th hidden state $H^{(l+1)} = g_\theta * H^{(l)}$. This can be approached by a layer-wise propagation rule:

$$H^{(l+1)} = \delta\left(D^{-\frac{1}{2}}AD^{-\frac{1}{2}}H^{(l)}W_\theta\right),$$

Where:
A is an $N_B \times N_B$ self-connected in-batch adjacency;
D is computed by D=diag (A1);
$\delta(\cdot)$ is the activation function;
$W_\theta$ refers to the linear transformation parameter; and
$H^{(l+1)}$ and $H^{(l)}$ are the two hidden states of the neural network.

The above propagation rule uses the first-order approximation of the localized graph filter. Again, here $\delta(\cdot)$ is the activation function and $W_\theta$ refers to the linear transformation parameter. A is an $N_B \times N_B$ self-connected in-batch adjacency and D can be defined by D=diag (A1). It can be seen in FIG. 3 that the in-batch adjacency A is determined by the semantic representations $\{s_i\}$, of which each entry $A^{(j,k)}$ can be computed by $$A^{(j,k)} = e - \frac{\|s_j - s_k\|^2}{t}.$$

In the multi-modal training network 240, two graph convolutional layers are built with output feature dimensions of $N_B \times 1024$ and $N_B \times M$ for a whole batch. The ReLU nonlinearity is chosen for the first layer and the sigmoid function for the second one to restrict the output values between 0 and 1.

In certain embodiments, a graph convolutional layer can be construed as performing elementary row transformation on a batch of data from fully-connected layer before activation according to the graph Laplacian of A. In this way, the semantic relations between different data points are intensified within the network hidden states, thus benefiting the zero-shot hashing functions in exploring the semantic knowledge. Traditionally, the task of correlating different deep representations can be tackled by adding a trace-like regularization term in the learning objective. However, this introduces additional hyper parameters to balance the loss terms, and the hidden states in the network of different data points may still be isolated.

The encoder-decoder model for the SBIR system 150 should also be addressed. A set of latent probability variables $b \in (0,1)^M$ may be obtained from the second graph convolutional layer output respective to $\{x, y\}$ corresponding to the hash code for a sketch-image pair $\{x, y\}$ with the semantic features. The stochastic neurons are imposed to b to produce binary codes $\tilde{b} \in \{0,1\}^M$ through a sampling procedure:

$$\tilde{b}^{(m)} = \begin{cases} 1 & b^{(m)} \geq \epsilon^{(m)}, \\ 0 & b^{(m)} < \epsilon^{(m)}, \end{cases} \text{ for } m = 1 \ldots M,$$

Where:
b refers to the output of the stochastic neuron;
$\tilde{b}$ is the sampled code from b; and
M represents the code length.

As indicated above, $\epsilon^{(m)} \sim \mathcal{U}([0, 1])$ are random variables. As shown below, this structure can be differentiable, allowing error back-propagation from the decoder to the previous layers. Therefore, the posterior of b, i.e., p (b|x, y), is approximated by a Multinoulli distribution:

$$q(\tilde{b}|x,y) = \Pi_{M=1}^M (b^{(m)})^{\tilde{b}^{(m)}} (1-b^{(m)})^{1-\tilde{b}^{(m)}}$$

Where:
b refers to the output of the stochastic neuron;
$\tilde{b}$ is the sampled code from b; and
M represents the code length.

We follow the idea of generative hashing to build a decoder on the top of the stochastic neurons. During optimization of the SBIR system 150, this decoder is regularized by the semantic representations s using the following Gaussian likelihood with a re-parametrization trick, i.e., $$p(s|b) = \mathcal{N}(s|\mu(b), \text{diag}(\sigma^2(b)))$$

Where:
b refers to the output of the stochastic neuron;
$\mathcal{N}(\cdot)$ refers to a Gaussian distribution; and
$\mu(\cdot)$ and $\sigma(\cdot)$ are the mean and variance of the Gaussian distribution, implemented by fully-connected layers.

The μ(•) and σ(•) are implemented by fully-connected layers with identity activations. To this end, the whole network can be trained end-to-end according to a learning objective.

The learning objective of the whole network for a batch of sketch and image data is defined as follows:

$$\mathcal{L} = \sum_{i=1}^{N_B} \mathbb{E}_{q(b|x_i, y_i)} \left[ \log q(b|x_i, y_i) - \log p(s_i|b) + \frac{1}{2M}(\|f(x_i)) - b\|^2 + \|g(y_i) - b\|^2 \right]$$

Where:
- b refers to the output of the stochastic neuron;
- $x_i$, $y_i$ are the representations of a pair of image and sketch;
- s represents the corresponding semantic word vector of the image-sketch pair; and
- $N_B$ is the batch size.

The expectation term $\mathbb{E}$ [•] in the above equation simulates the variational-like learning objectives as a generative model. However, it does not lower-bound any data prior distribution since it is generally not feasible for the zero-shot SBIR system 150. $\mathbb{E}$ [•] here is an empirically-built loss, simultaneously maximizing the output code entropy via $\mathbb{E}_{q(b|x,y)}$ [log q(b|x,y)] and preserving the semantic knowledge for the zero-shot task by $\mathbb{E}_{q(b|x,y)}$ [−log p(s|b)]. The single-model encoding functions $f(•)$ and $g(•)$ are trained by the stochastic neurons outputs of the multi-modal network using L-2 losses. The sketch-image similarities can be reflected in assigning related sketches and images with the sample code. To this end, $f(•)$ and $g(•)$ are able to encode out-of-sample data without additional category information, as the imposed training codes are semantic-knowledge-aware. The gradient of our learning objective with respect to the network parameter Θ can be estimated by a Monte Carlo process in sampling b̃ using the small random signal E according to the sampling procedure described for the encoder-decoder model, which can be derived as:

$$\nabla_\Theta \mathcal{L} \simeq \sum_{i=1}^{N_B} \mathbb{E}_\epsilon \left[ \nabla_\Theta \left( \log q(\tilde{b}|x_i, y_i) - \log p(s_i|\tilde{b}) + \frac{1}{2M}(\|f(x_i) - \tilde{b}\|^2 + \|g(y_i) - \tilde{b}\|^2) \right) \right],$$

Where:
- b refers to the output of the stochastic neuron;
- $x_i$, $y_i$ are the representations of a pair of image and sketch;
- s represents the corresponding semantic word vector of the image-sketch pair; and
- $N_B$ is the batch size.

As log q(•) forms up into an inverse cross-entropy loss and log p(•) is reparametrized, this estimated gradient can be computed. Algorithm 1 (below) illustrates the whole training process of the proposed SBIR system 150, where the operator Γ(•) refers to an optimizer for adaptive gradient scaling. Different from many other deep cross-modal and zero-shot hashing models which require alternating optimization procedures, the hashing scheme utilized by the SBIR system 150 can be efficiently and conveniently trained end-to-end with stochastic gradient descent (SGD).

Algorithm 1: The Training Procedure of Zero-Shot Sketch-Image Hashing

Input: Sketch-image dataset $\mathcal{O}$ = {X, Y}, semantic representations S and max training iteration T
Output: Network parameters Θ
repeat
   | Get a random mini-batch $\{x_i, y_i, s_i\}_{i=1}^{N_B}$ assuring $x_i, y_i$, belong
   |  to the same class
   | Build A according to semantic distances
   | for i = 1 ... $N_B$ do
   |  | Sample a set of $\epsilon^{(m)} \sim \mathcal{U}$ ([0, 1])
   |  | Same of a set of b̃ ~ q (b|$x_i, y_i$)
   | end
   | $\mathcal{L} \leftarrow$ according to above equation defining learning objective
   | Θ ← Θ − Γ ($\nabla_\Theta \mathcal{L}$) according to above equation estimating the
   |  gradient of learning objective
   | until convergence or max training iter T is reached;

When the network of the SBIR system 150 is trained, it is able to hash image and sketch data from the unseen classes $C^u$ for matching. The codes can be obtained as follows:

$$B^{im} = (\text{sign}(f(X^u - 0.5)) + 1)/2 \in \{0,1\}^{N^u \times M},$$

$$B^{sk} = (\text{sign}(g(Y^u - 0.5)) + 1)/2 \in \{0,1\}^{N^u \times M},$$

Where:
- $B^{im}$ refers to the hash code of test images;
- $B^{sk}$ refers to the hash code of test sketches;
- $X^u$ refers to the original features of test images;
- $Y^u$ refers to the original features of test sketches;
- $N^u$ is the size of test data; and
- M is the code length.

As indicated above, $N^u$ is the size of test data. As is shown in FIG. 3, the encoding networks $f(•)$ and $g(•)$ are configured to stand on their own. Once trained, semantic representations of test data are not required and there is no need to render data to the multi-modal network. Thus, encoding test data is non-trivial and can be efficient.

Extensive experiments and ablation studies were conducted to evaluate an implementation of the SBIR system 150 described herein. The results demonstrate that the SBIR techniques provide a realistic solution for efficiently performing large-scale zero-shot SBIR. An end-to-end three-network deep architecture was successfully designed to learn shared binary representations and to encode sketch-image data. Modality heterogeneity between sketches and images was mitigated by a Kronecker layer with attended features, and semantic knowledge was introduced to supplement visual information by using graph convolutions and a generative hashing scheme. Experiments demonstrated that the proposed SBIR techniques significantly outperform existing methods.

Figure 4:
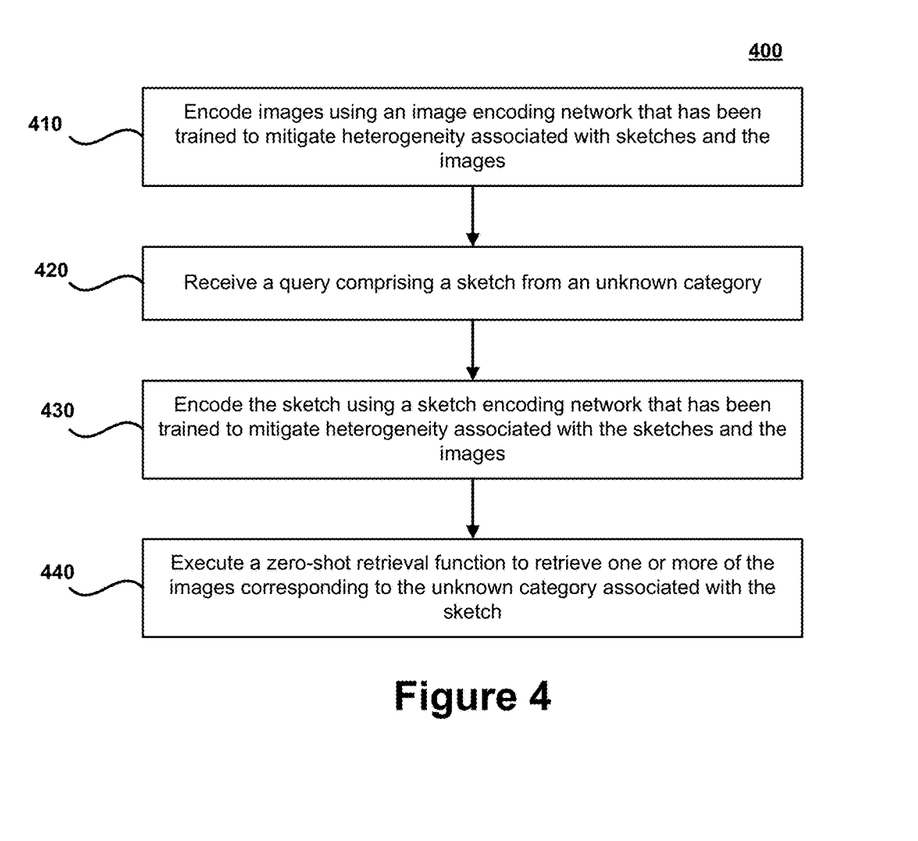
FIG. 4 is a flow chart of a method for implementing an exemplary SBIR technique in accordance with certain embodiments of the present invention.

FIG. 4 is a flow chart of a method 400 for implementing an exemplary SBIR technique in accordance with certain embodiments of the present invention. The exemplary method 400 may be executed in whole or in part by the SBIR system 150. For example, one or more storage devices 201 can store instructions for performing the steps of method 400, and one or more processors 202 can be configured to execute performance of the steps of method 400.

In step 410, images are encoded using an image encoding network 230 that has been trained to mitigate heterogeneity associated with sketches 130 and the images 140. As explained above, a multi-modal training network 240 may be utilized to train an image hashing function 231 of the image encoding network 230 to produce binary representations or binary codes for the images 140 in a manner that lessens the appearance gap between sketches 130 and images 140. This may be performed, at least in using a fused representation layer 241 (e.g., a Kronecker product fusion layer) that merges the feature vector outputs of sketch-image pairs that are processed during training, and configuring the image encoding network 230 to leverage semantic knowledge learned during training.

In step 420, a query comprising a sketch 130 from an unknown category is received. The query may be received directed by the SBIR system 150 (e.g., via an input device attached to a device which hosts the SBIR system 150) or from a computing device 110 that is in communication with the SBIR system 150 over a network 160. The query may correspond to a request to retrieve images 140 corresponding to the received sketch 130.

In step 430, the sketch 130 is encoded using a sketch encoding network 220 that has been trained to mitigate heterogeneity associated with the sketches 130 and the images 140. Similar to step 430, a multi-modal training network 240 may be utilized to train a sketch hashing function 221 of the sketch encoding network 220 to produce binary representations or binary codes for the sketches 130 in a manner that lessens the appearance gap between sketches 130 and images 140. This may be performed, at least in using a fused representation layer 241 (e.g., a Kronecker product fusion layer) that merges the feature vector outputs of sketch-image pairs that are processed during training, and configuring the sketch encoding network 220 to leverage semantic knowledge learned during training.

In step 440, a zero-shot retrieval function 250 is executed to retrieve one or more of the images 140 corresponding to the unknown category associated with the sketch 130. The zero-shot retrieval function 250 is configured to identify one or more images 140 corresponding to the unknown category of the sketch 130 despite the fact that the SBIR system 150 was not trained to correlate sketches 130 and images 140 in the unknown category. The zero-shot retrieval function 250 is able to utilize semantic knowledge learned from known categories to identify the images 140 corresponding to the unknown category.

While various novel features of the invention have been shown, described and pointed out as applied to particular embodiments thereof, it should be understood that various omissions and substitutions and changes in the form and details of the systems and methods described and illustrated, may be made by those skilled in the art without departing from the spirit of the invention. Amongst other things, the steps in the methods may be carried out in different orders in many cases where such may be appropriate. Those skilled in the art will recognize, based on the above disclosure and an understanding therefrom of the teachings of the invention, that the particular hardware and devices that are part of the system described herein, and the general functionality provided by and incorporated therein, may vary in different embodiments of the invention. Accordingly, the description of system components are for illustrative purposes to facilitate a full and complete understanding and appreciation of the various aspects and functionality of particular embodiments of the invention as realized in system and method embodiments thereof. Those skilled in the art will appreciate that the invention can be practiced in other than the described embodiments, which are presented for purposes of illustration and not limitation. Variations, modifications, and other implementations of what is described herein may occur to those of ordinary skill in the art without departing from the spirit and scope of the present invention and its claims.

What is claimed is:

1. A system for performing sketch-based image retrieval (SBIR) comprising:
   one or more computing devices comprising one or more processors and one or more non-transitory storage devices for storing instructions, wherein execution of the instructions by the one or more processors causes the one or more computing devices to:
   encode images using an image encoding network that has been trained to mitigate heterogeneity associated with sketches and the images;
   receive a query comprising a sketch from an unknown category;
   encode the sketch using a sketch encoding network that has been trained to mitigate heterogeneity associated with the sketches and the images; and
   utilize the encoded sketch to execute a zero-shot retrieval function for retrieving one or more of the images corresponding to the unknown category associated with the sketch;
   wherein a multi-modal neural training network is utilized to train the sketch encoding network and the image encoding network to generate binary codes for the sketches and the images in a manner that mitigates heterogeneity of the sketches and the images; and
   wherein a fused representation layer of the multi-modal neural training network is used to merge outputs from attention models associated with the sketch encoding network and the image encoding network to derive the binary codes for the sketches and the images.

2. The system of claim 1, wherein the fused representation layer is a Kronecker product fusion layer.

3. The system of claim 1, wherein executing the zero-shot retrieval function to retrieve the one or more images includes utilizing semantic knowledge derived from one or more known categories of information to identify the one or more images corresponding to the unknown category.

4. The system of claim 3, wherein the multi-modal neural training network trains the sketch encoding network and the image encoding network to utilize the semantic knowledge via a graph convolutional network and a decoding model.

5. The system of claim 1, wherein the attention models that are configured to identify portions of the images and the sketches that are informative for cross-modal mapping.

6. The system of claim 1, wherein the sketch encoding network and the image encoding network are implemented as convolutional neural networks.

7. A method for performing sketch-based image retrieval (SBIR) comprising:
   encoding images using an image encoding network that has been trained to mitigate heterogeneity associated with sketches and the images;
   receiving a query comprising a sketch from an unknown category;
   encoding the sketch using a sketch encoding network that has been trained to mitigate heterogeneity associated with the sketches and the images; and
   utilizing the encoded sketch to execute a zero-shot retrieval function for retrieving one or more of the images corresponding to the unknown category associated with the sketch;
   wherein a multi-modal neural training network is utilized to train the sketch encoding network and the image encoding network to generate binary codes for the sketches and the images in a manner that mitigates heterogeneity of the sketches and the images; and wherein a fused representation layer of the multi-modal neural training network is used to merge outputs from attention models associated with the sketch encoding network and the image encoding network to derive the binary codes for the sketches and the images.

8. The method of claim 7, wherein the fused representation layer is a Kronecker product fusion layer.

9. The method of claim 7, wherein executing the zero-shot retrieval function to retrieve the one or more images includes utilizing semantic knowledge derived from one or more known categories of information to identify the one or more images corresponding to the unknown category.

10. The method of claim 9, wherein the multi-modal neural training network trains the sketch encoding network and the image encoding network to utilize the semantic knowledge via a graph convolutional network and a decoding model.

11. The method of claim 7, wherein the attention models are configured to identify portions of the images and the sketches that are informative for cross-modal mapping.

12. The method of claim 7, wherein the sketch encoding network and the image encoding network are implemented as convolutional neural networks.

13. A computer program product for performing sketch-based image retrieval (SBIR), the computer program product comprising a non-transitory computer-readable medium including codes for causing a computer to:
encode images using an image encoding network that has been trained to mitigate heterogeneity associated with sketches and the images;
receive a query comprising a sketch from an unknown category;
encode the sketch using a sketch encoding network that has been trained to mitigate heterogeneity associated with the sketches and the images; and
utilize the encoded sketch to execute a zero-shot retrieval function for retrieving one or more of the images corresponding to the unknown category associated with the sketch;
wherein a multi-modal neural training network is utilized to train the sketch encoding network and the image encoding network to generate binary codes for the sketches and the images in a manner that mitigates heterogeneity of the sketches and the images; and
wherein a fused representation layer of the multi-modal neural training network is used to merge outputs from attention models associated with the sketch encoding network and the image encoding network to derive the binary codes for the sketches and the images.

14. The computer program product of claim 13, wherein executing the zero-shot retrieval function to retrieve the one or more images includes utilizing semantic knowledge derived from one or more known categories of information to identify the one or more images corresponding to the unknown category.

15. A system for performing sketch-based image retrieval (SBIR) comprising:
one or more computing devices comprising one or more processors and one or more non-transitory storage devices for storing instructions, wherein execution of the instructions by the one or more processors causes the one or more computing devices to:
encode images using an image encoding network that has been trained to mitigate heterogeneity associated with sketches and the images;
receive a query comprising a sketch from an unknown category;
encode the sketch using a sketch encoding network that has been trained to mitigate heterogeneity associated with the sketches and the images; and
utilize the encoded sketch to execute a zero-shot retrieval function for retrieving one or more of the images corresponding to the unknown category associated with the sketch;
wherein executing the zero-shot retrieval function to retrieve the one or more images includes utilizing semantic knowledge derived from one or more known categories of information to identify the one or more images corresponding to the unknown category; and
wherein a multi-modal neural training network trains the sketch encoding network and the image encoding network to utilize the semantic knowledge via a graph convolutional network and a decoding model.

16. A method for performing sketch-based image retrieval (SBIR) comprising:
encoding images using an image encoding network that has been trained to mitigate heterogeneity associated with sketches and the images;
receiving a query comprising a sketch from an unknown category;
encoding the sketch using a sketch encoding network that has been trained to mitigate heterogeneity associated with the sketches and the images; and
utilizing the encoded sketch to execute a zero-shot retrieval function for retrieving one or more of the images corresponding to the unknown category associated with the sketch;
wherein executing the zero-shot retrieval function to retrieve the one or more images includes utilizing semantic knowledge derived from one or more known categories of information to identify the one or more images corresponding to the unknown category; and
wherein a multi-modal neural training network trains the sketch encoding network and the image encoding network to utilize the semantic knowledge via a graph convolutional network and a decoding model.

17. A computer program product for performing sketch-based image retrieval (SBIR), the computer program product comprising a non-transitory computer-readable medium including codes for causing a computer to:
encode images using an image encoding network that has been trained to mitigate heterogeneity associated with sketches and the images;
receive a query comprising a sketch from an unknown category;
encode the sketch using a sketch encoding network that has been trained to mitigate heterogeneity associated with the sketches and the images; and
utilize the encoded sketch to execute a zero-shot retrieval function for retrieving one or more of the images corresponding to the unknown category associated with the sketch;
wherein executing the zero-shot retrieval function to retrieve the one or more images includes utilizing semantic knowledge derived from one or more known categories of information to identify the one or more images corresponding to the unknown category; and
wherein a multi-modal neural training network trains the sketch encoding network and the image encoding network to utilize the semantic knowledge via a graph convolutional network and a decoding model.

* * * * *